United States Patent
Mula et al.

(10) Patent No.: US 12,120,035 B2
(45) Date of Patent: Oct. 15, 2024

(54) LATENCY DETECTION USING MULTIPLE CLOCKS, INCLUDING DETERMINATION OF WHETHER LATENCY EXCEEDS A THRESHOLD

(71) Applicant: MELLANOX TECHNOLOGIES, LTD., Yokneam (IL)

(72) Inventors: Liron Mula, Herzliya (IL); Aviv Kfir, Nili (IL); Miri Shtaif, Givaataim (IL); Eran Gil Beracha, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 367 days.

(21) Appl. No.: 17/844,362

(22) Filed: Jun. 20, 2022

(65) Prior Publication Data
US 2023/0412519 A1    Dec. 21, 2023

(51) Int. Cl.
*H04L 47/56* (2022.01)
*H04L 43/0852* (2022.01)
*H04L 47/625* (2022.01)

(52) U.S. Cl.
CPC .......... *H04L 47/56* (2013.01); *H04L 43/0852* (2013.01); *H04L 47/625* (2013.01)

(58) Field of Classification Search
CPC ..... H04L 43/0852; H04L 43/16; H04L 47/56; H04L 47/625
See application file for complete search history.

(56) References Cited

U.S. PATENT DOCUMENTS

| | | | | |
|---|---|---|---|---|
| 5,940,370 A * | 8/1999 | Curtis | ............... | H04Q 3/0066 370/231 |
| 6,363,056 B1 * | 3/2002 | Beigi | ............... | H04L 43/10 709/224 |
| 6,574,781 B1 * | 6/2003 | Harada | ............... | G06F 1/10 716/114 |
| 6,735,679 B1 * | 5/2004 | Herbst | ............... | H04L 47/10 711/167 |
| 6,737,904 B1 * | 5/2004 | Butaud | ............... | G06F 1/04 331/78 |
| 6,751,238 B1 * | 6/2004 | Lipp | ............... | H04J 3/062 370/516 |
| 7,209,440 B1 * | 4/2007 | Walsh | ............... | H04L 47/29 710/52 |
| 8,174,969 B1 * | 5/2012 | Kommidi | ............... | H04L 49/50 370/229 |
| 8,891,513 B1 * | 11/2014 | Huang | ............... | H04L 49/253 370/352 |
| 9,876,602 B1 * | 1/2018 | Tosatti | ............... | G06F 1/324 |
| 10,616,063 B1 * | 4/2020 | Dutta | ............... | H04L 65/611 |
| 2002/0012344 A1 * | 1/2002 | Johnson | ............... | H04Q 3/5455 370/389 |
| 2002/0017939 A1 * | 2/2002 | Okuda | ............... | G11C 7/1051 327/296 |

(Continued)

*Primary Examiner* — Stephen J Clawson
(74) *Attorney, Agent, or Firm* — Sheridan Ross PC

(57) ABSTRACT

A device, a switch, and a method of determining latency which exceeds a threshold are described. A task is enqueued and a time is determined based on two clocks. A time the task is dequeued is determined based on the two clocks. Based on the time of enqueue and the time of dequeue according to each of the two clocks, the task is identified as meeting or violating a service level agreement.

20 Claims, 5 Drawing Sheets

(56) References Cited

U.S. PATENT DOCUMENTS

| | | | |
|---|---|---|---|
| 2012/0106976 A1* | 5/2012 | Bernard | H04J 3/0647 398/154 |
| 2014/0016474 A1* | 1/2014 | Beheshti-Zavareh | H04L 47/22 370/236 |
| 2015/0163048 A1* | 6/2015 | Turnbull | H04J 3/16 370/508 |
| 2015/0163155 A1* | 6/2015 | Beheshti-Zavareh | H04L 47/22 370/236 |
| 2015/0207649 A1* | 7/2015 | Shi | H04L 25/03019 375/232 |
| 2019/0036832 A1* | 1/2019 | Williams, Jr. | H04L 47/34 |
| 2019/0052565 A1* | 2/2019 | Modi | H04L 47/283 |
| 2019/0349309 A1* | 11/2019 | Bonig | H04W 4/023 |
| 2020/0120020 A1* | 4/2020 | Dutta | H04L 45/04 |
| 2020/0186465 A1* | 6/2020 | Dontula Venkata | H04L 49/25 |
| 2020/0403902 A1* | 12/2020 | Saad | H04L 45/302 |
| 2021/0135967 A1* | 5/2021 | Iorga | H04L 41/0886 |
| 2022/0191144 A1* | 6/2022 | Terstrup | H04L 45/74591 |
| 2023/0058200 A1* | 2/2023 | Singh | H04L 45/14 |
| 2023/0262112 A1* | 8/2023 | Dunbar | H04L 67/1004 709/224 |
| 2023/0300060 A1* | 9/2023 | Dunbar | H04L 47/125 370/235 |

* cited by examiner

LATENCY DETECTION USING MULTIPLE CLOCKS, INCLUDING DETERMINATION OF WHETHER LATENCY EXCEEDS A THRESHOLD

FIELD OF THE DISCLOSURE

The present disclosure is generally directed to timing systems, and more particularly to a system for detecting latency which exceeds a latency threshold using a plurality of clocks.

BACKGROUND

Conventional systems for determining whether a task is latent are insufficient in a number of ways. For example, conventional systems rely upon a clock or counter which counts in cycles from zero to a maximum number before resetting to zero. If a task is received or enqueued in a first cycle and transmitted or dequeued in a later cycle, conventional systems are at a loss as to how many cycles the task has been in the system or in the queue.

Computer systems are constantly receiving, handling, and/or transmitting data, such as tasks and packets. Some computer systems, such as switches, operate to receive data from a first node and transmit the data to a second node. It is important that such a computer system handles the data or transmits the data between the nodes quickly and efficiently.

When a packet enters a switch, for example, the packet is conventionally given a timestamp of when the packet entered. Due to bit limitation, the time is finite and when the time reaches the maximum value, the time wraps around itself. For example, if a packet enters a switch at 0010 time units according to a four bit clock and stays in the switch for 10000 time units, the conventional switch will estimate the packet stayed in the switch for only 1000mod1111 or 0001 time units. This estimation is inaccurate since the actual latency of the packet is 10000 but the switch estimates a latency of one.

This inaccuracy of the conventional switch creates a blind spot which may be exploited. The blind spot is a time frame in which the clock estimates the latency is below a latency threshold, but the latency is actually above the threshold. The latency threshold may be a particular amount of time, for example according to an SLA, at or after which the time is excessively latent.

SUMMARY

In an embodiment disclosed herein, a device, such as a switch, a network interface controller (NIC), or other computer system capable of receiving and transmitting data, is enabled to receive a task, determine a time of receipt or a time the task was added to a queue according to two or more clocks, handle the task—by, for example, performing an action or sending the task to a destination—determine a time of departure or a time the task was removed from the queue according to the two or more clocks, and determine a latency according to each of the two or more clocks. Using the determined latency according to each of the two or more clocks, the device may be enabled to generate an estimate of the actual latency of the task. As described herein, a device may be enabled to determine whether a task is latent or whether a large number of tasks are latent in an accurate and efficient manner.

Systems and methods as described herein offer a number of advantages over conventional approaches. Users, operators, manufacturers, etc., of a computer system often have a need to determine whether the computer system is operating properly or is suffering from excessive latency.

Computer systems, such as switches, conventionally use simple counting mechanisms to count time. For example, a counter which counts up from zero to a particular number before resetting to zero and repeating the process of counting to the particular number.

To determine an amount of time a computer system takes to handle a particular task or packet after receiving the task, the computer system may consult the current count of such a counter at a first time point, such as upon receiving the task or packet, and compare that count to a count of the same counter upon handling or transmitting the task or packet.

A problem arises in that the counter constantly counts up to a maximum count value before resetting to zero. Consider an example counter with three bits. A packet is received by a computer system at a point at which the counter is at 011. While the packet is being handled, or before the packet is transmitted, the counter reaches 111, resets to 000, and continues counting upward. When the packet is transmitted, the counter is at a count 010, but there is no record of how many times the counter reset to 000. So, the packet has been in the computer system for 7+8N clock ticks, where N is any number greater than or equal to zero.

It may be possible for certain packets to repeatedly surpass a latency threshold without being identified using conventional systems. For example, consider an excessive latency according to an SLA of six, and a counter with a maximum value of eight. A task which is in a queue for five plus 8N clock ticks would be associated with a latency of five regardless of the value of N.

A malicious entity may be enabled to take advantage of such a flaw by transmitting multiple packets or tasks through a switch or other computing device where each packet or task is designed to take five plus 8N clock ticks, in which N is greater than zero. This would result in every packet exceeding the latency threshold and violating the SLA without the device recognizing the situation.

As disclosed herein, systems and methods of determining latency in a fast and efficient manner may be implemented using two or more counters. In at least one embodiment, a method comprises determining a first length of time, according to a first clock, between an enqueuing of a task and a dequeuing of the task; determining a second length of time, according to a second clock, between the enqueuing of the task and the dequeuing of the task, wherein the second clock is modified by a random element after the second clock reaches a maximum value; and based on the first length of time and the second length of time, determining a latency of the task exceeds a latency threshold.

Aspects of the above embodiments include wherein the random element comprises modifying a time duration of a clock period of the second clock. Alternatively, or additionally, the random element may comprise pausing the second clock a random amount of time after the second clock reaches the maximum value and before resetting the second clock to zero. As described herein, using two or more counters or clocks, a computer system such as a switch may be enabled to determine whether excessive latency, such as in violation of a service level agreement (SLA), is occurring.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

Figure 1:
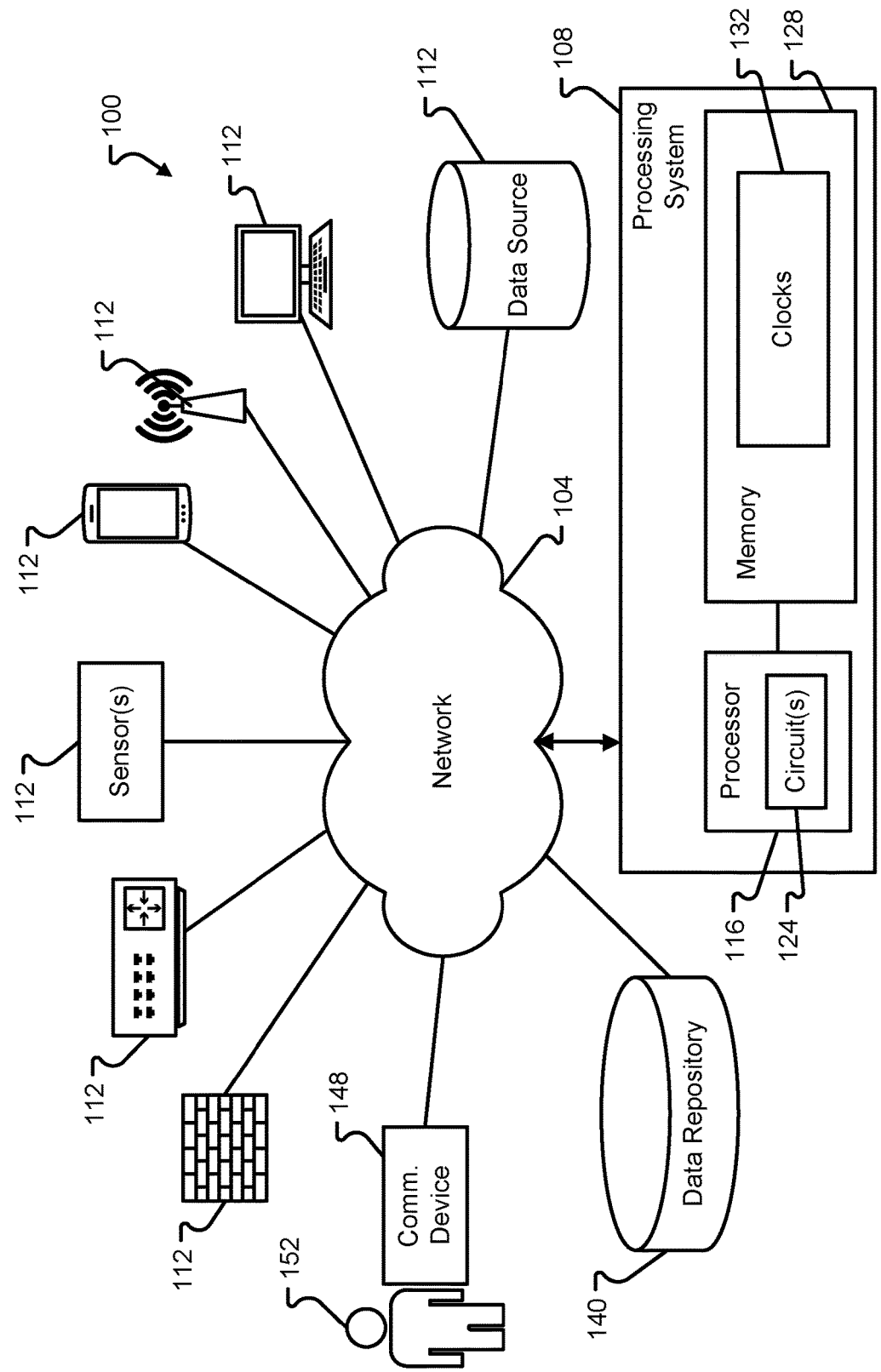
FIG. 1 is an illustration of a computing environment in accordance with one or more embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Datacenters are the storage and data processing hubs of the Internet. The deployment of cloud applications is causing datacenters to expand exponentially in size, stimulating the development of faster switches than can cope with the increasing data traffic inside the datacenter. Current state-of-the-art switches are capable of handling over 25 Tb/s of traffic by employing electrical switches in the form of application specific integrated circuits (ASICs) equipped with 256 data lanes, each operating at 100 Gb/s. Such switching ASICs typically consume as much as 400 Watts, and the power consumption of the optical transceiver interfaces attached to each ASIC is comparable. To keep pace with traffic demand, switch capacity doubles approximately every two years. To date, rapid switch scaling has been made possible by exploiting advances in manufacturing (e.g., CMOS techniques), collectively described by Moore's law (i.e., the observation that the number of transistors in a dense integrated circuit doubles about every two years). However, in recent years there are strong indications of Moore's law slowing down, which raises concerns about the capability to sustain the target scaling rate of switch capacity. As a result, alternative technologies are being investigated.

Optical switches are one solution for enabling advances in networking due to the technology's potential for extremely high data capacity and low power consumption. Optical switches feature optical input and output ports and are capable of routing light that is coupled to the input ports to the intended output ports on demand, according to one or more control signals (electrical or optical control signals). Routing of the signals can be performed in the optical domain, i.e., without the need for optical-electrical and electrical-optical conversion, thus bypassing the need for power-consuming transceivers. Header processing and buffering of the data is not straight-forward in the optical domain and thus, packet switching (as it is realized in electrical switches) is not normally employed. Instead, the circuit switching paradigm is used: an end-to-end circuit is created for the communication between two endpoints connected on the input and the output of the optical switch.

Referring to FIG. 1, an illustrative computing environment 100 will be described in accordance with at least some embodiments of the present disclosure. A computing environment 100 may include a communication network 104, which is configured to facilitate machine-to-machine communications. In some embodiments, the communication network 104 may enable communications between several types of computer systems, which may also be referred to herein as data sources 112. One or more of the data sources 112 may be provided as part of a common network infrastructure, meaning that the data sources 112 may be owned and/or operated by a common entity. In such a situation, the entity that owns and/or operates the network including the data sources 112 may be interested in obtaining data packets from the various data sources 112.

Non-limiting examples of data sources 112 may include communication endpoints (e.g., user devices, Personal Computers (PCs), computing devices, communication devices, Point of Service (Pos) devices, laptops, telephones, smartphones, tablets, wearables, etc.), network devices (e.g., routers, switches, servers, network access points, etc.), network border devices (e.g., firewalls, Session Border Controllers (SBCs), Network Address Translators (NATs), etc.), security devices (access control devices, card readers, biometric readers, locks, doors, etc.), and sensors (e.g., proximity sensors, motion sensors, light sensors, noise sensors, biometric sensors, etc.). A data source 112 may alternatively or additionally include a data storage area that is used to store data packets generated by various other machines connected to the communication network 104. The data storage area may correspond to a location or type of device that is used to temporarily store data packets until a processing system 108 is ready to retrieve and process the data packets.

In some embodiments, a processing system 108 is provided to receive tasks, such as data packets, from data sources 112 and handle the tasks while determining a latency of the tasks. The processing system 108 may be executed on one or more servers that are also connected to the communication network 104. The processing system 108 may be a switch, a NIC, or other device operable to receive and transmit data packets. The processing system 108 may be configured to determine a latency of any received task or packet according to a plurality of clocks 132. As illustrated in FIGS. 3A-3D, two or more clocks may be used to count time. As described in greater detail below, a first clock, represented by the upper square wave of each of FIGS. 3A-3D may count at a constant rate to a constant maximum count value. A second clock, represented by the lower square wave of each of FIGS. 3A-3D may be adjusted randomly as described below.

Each clock may be of a particular number of bits. In some embodiments, the first clock may contain a greater number of bits than a latency threshold. In this way, the maximum amount of time the first clock can count before wrapping around to zero would be 2^(number of bits of the first clock)*(time_quanta), where time_quanta is the resolution of the first clock or the clock rate, meaning each clock tick of the first clock is equivalent to one time_quanta. As an example, if the first clock contains Y=30 bits, and time_quanta=10 nanoseconds, the first clock can count to $2^{30} \times 10^{-9} \cong 1.073$ seconds. When a clock reaches its maximum value, the next clock cycle will wrap around, for example:

11111111→00000000→00000001→00000010→00000011.

The pulses of the square waves of FIGS. 3A-3D may be sourced from one or more clock signals. With each new pulse from a clock signal, a count value of the first and second clocks may be increased. It should be appreciated, and as described below, the first and second clocks may count at different and sometimes varying rates.

The processing system 108 may be configured to determine, based on an analysis of a data packet, an address to transmit the data packet and to transmit the data packet to the determined address. The processing system 108 is depicted as a single component in the system 100 for ease of discussion and understanding. It should be appreciated that the processing system 108 and components thereof (e.g., processor 116, circuit(s) 124, and/or memory 128) may be deployed in any number of computing architectures. For instance, the processing system 108 may be deployed as a switch, a NIC, a server, a collection of servers, a collection of blades in a single server, on bare metal, on the same premises as the data sources 112, in a cloud architecture (enterprise cloud or public cloud), and/or via one or more virtual machines.

Non-limiting examples of a communication network 104 include an Internet Protocol (IP) network, an Ethernet network, an InfiniBand (IB) network, a FibreChannel network, the Internet, a cellular communication network, a wireless communication network, combinations thereof (E.g., Fibre Channel over Ethernet), variants thereof, and the like.

As mentioned above, the data sources 112 may be considered host devices, servers, network appliances, data storage devices, security devices, sensors, or combinations thereof. It should be appreciated that the data source(s) 112 may be assigned at least one network address and the format of the network address assigned thereto may depend upon the nature of the network 104.

The processing system 108 is shown to include a processor 116 and memory 128. While the processing system 108 is only shown to include one processor 116 and one memory 128, it should be appreciated that the processing system 108 may include one or many processing devices and/or one or many memory devices. The processor 116 may be configured to execute instructions stored in memory 128 which may involve utilizing one or clocks 132 which may be in the form of registers stored in memory 128. As some non-limiting examples, the memory 128 may correspond to any appropriate type of memory device or collection of memory devices configured to store instructions and/or instructions. Non-limiting examples of suitable memory devices that may be used for memory 128 include Flash memory, Random Access Memory (RAM), Read Only Memory (ROM), variants thereof, combinations thereof, or the like. In some embodiments, the memory 128 and processor 116 may be integrated into a common device (e.g., a microprocessor may include integrated memory).

In some embodiments, the processing system 108 may have the processor 116 and memory 128 configured as a GPU. Alternatively, or additionally, the processor 116 and memory 128 may be configured as a CPU. A GPU configuration may enable parallel operations on multiple sets of data, which may facilitate the real-time processing of one or more data packets from one or more data sources 112. If configured as a GPU, the circuits 124 may be designed with thousands of processor cores running simultaneously, where each core is focused on making efficient calculations.

As noted above, the data source(s) 112, data repository 140, and/or the processing system 108 may include storage devices and/or processing circuitry for conducting computing tasks, for example, tasks associated with controlling the flow of data internally and/or over the communication network 104. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally, or alternatively, the processing circuitry incorporated in a data source 112 and/or processing system 108 may comprise hardware, such as an application specific integrated circuit (ASIC). Other non-limiting examples of the processing circuitry include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the processing circuitries may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the data source(s) 112, data repository 140, and/or the processing system 108 may include one or more communication interfaces for facilitating wired and/or wireless communication between one another and other unillustrated elements of the environment 100.

A processing system 108 may operate as an Ethernet switch, an InfiniBand switch, or another type of networking device. A processing system 108 may comprise, as described in greater detail below, an enclosure with external pluggable modules and one or more internal printed circuit boards (PCBs).

Figure 2:
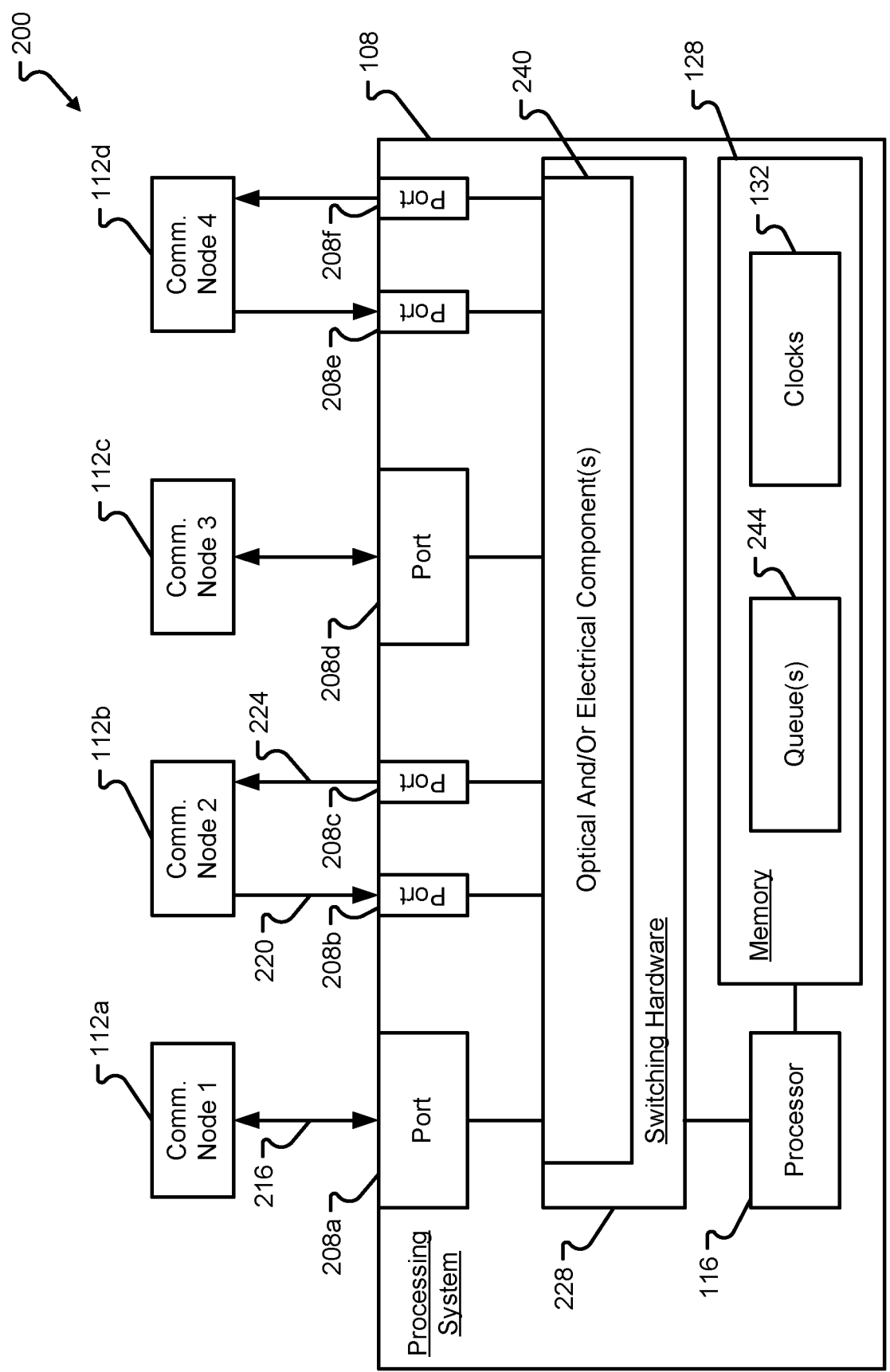
FIG. 2 is an illustration of a computing device in accordance with one or more embodiments of the present disclosure.

Referring initially to FIG. 2, a configuration of a communication system 200 will be described in accordance with at least some embodiments of the present disclosure. It should be appreciated that the components described with reference to FIG. 2 may or may not also be used in an environment 100 as shown in FIG. 1.

In the configuration of FIG. 2, a communication system 200 is shown to include a processing system 108, such as a switch, connecting one or more data sources 112 via a number of communication ports 208. The illustrated processing system 108 is shown to be connected with four data sources data source 112*a-d* via a plurality of communication ports 208. The illustration of four data sources data source 112*a-d* is for ease of discussion and should not be construed as limiting embodiments of the present disclosure. Specifically, a processing system 108 may be configured to connect any suitable number of data sources data source 112 and the processing system 108 may include a number of ports 208 to facilitate such connections. Even more specifically, a processing system 108 may be configured to connect a greater or lesser number of data sources data source 112 than are shown in FIG. 2. Moreover, embodiments of the present disclosure contemplate that not all ports 208 of a processing system 108 need to be connected with a data source 112. For instance, one or more ports 208 of a processing system 108 may be left unconnected (e.g., open) and may not have any particular networking cable 216 plugged into the port 208.

The data sources data source 112*a-d* may be the same type of devices or several types of devices. As a non-limiting example, some or all of the data sources 112*a-d* may correspond to a Top-of-Rack (TOR) switch. Alternatively, or additionally, one or more of the data sources data source 112*a-d* may correspond to a device other than a TOR switch. The data sources data source 112*a-d* do not necessarily need to communicate using the same communication protocol because the processing system 108 may include components to facilitate protocol conversion and/or a data source 112 may be connected to the processing system 108 via a pluggable network adapter.

While the data sources data source 112*a-d* may correspond to a TOR switch, one or more of the data sources 112*a-d* may be considered host devices, servers, network appliances, data storage devices, or combinations thereof. A data source 112, in some embodiments, may correspond to one or more of a Personal Computer (PC), a laptop, a tablet, a smartphone, a server, a collection of servers, or the like. It should be appreciated that a data source 112 may be referred to as a host, which may include a network host, an Ethernet host, an InfiniBand (TB) host, etc. As another specific but non-limiting example, one or more of the data sources 112 may correspond to a server offering information resources, services and/or applications to user devices, client devices, or other hosts in the environment 100. It should be appreciated that the data sources 112 may be assigned at least one network address (e.g., an IP address) and the format of the network address assigned thereto may depend upon the nature of the network to which the data source 112 is connected.

FIG. 2 illustrates that one or multiple networking cables may be used to connect a data source 112 to a processing system 208. In some embodiments, a data source 112 (e.g., the first data source 112*a* and third data source 112*c*) may connect to a single port 208 (e.g., the first port 208*a* and fourth port 208*d*) via a bidirectional communication link 216. The bidirectional communication link 216 may be established over a networking cable and may utilize any suitable communication protocol known or yet to be developed for the transmission of data packets.

A data source 112 (e.g., the second data source 112*b* and fourth data source 112*d*) may alternatively, or additionally, be connected with the processing system 108 via multiple ports 208 (e.g., the second port 208*b*, third port 208*c*, fifth port 208*e*, and sixth port 208*f*). In such a configuration, one of the ports 208 may be used to carry packets from the processing system 108 to the data source 112 whereas the other of the ports 208 may be used to carry packets between the data source 112 and the processing system 108. As an example, the second port 208*b* is shown to receive packets from the second data source 112*b* via a data uplink 220 whereas the third port 208*c* is shown to carry packets from the processing system 108 to the second data source 112*b* via a data downlink 224. In this configuration, separate networking cables may be used for the data uplink 220 and the data downlink 224.

The processing system 108 may correspond to an optical switch and/or electrical switch. In some embodiments, the processing system 108 may include switching hardware 228 that is configurable to selectively interconnect the plurality of ports 208*a-f*, thereby enabling communications between the plurality of ports 208*a-f*, which enables communications between the data sources 112*a-d*. In some embodiments, the switching hardware 228 may be configured to selectively enable the plurality of data sources 112*a-d* to communicate in pairs based on a particular configuration of the switching hardware 228. Specifically, the switching hardware 228 may include optical and/or electrical component(s) 240 that are switchable between different matching configurations. In some embodiments, the optical and/or electrical components 240 may be limited in the number of matching configurations it can accommodate, meaning that a port 208 may not necessarily be connected with/matched with every other port 208 at a particular instance in time.

In some embodiments, the processing system 108 may correspond to an optical circuit switch, which means that the optical and/or electrical components 240 may include a number of optical and/or opto-electronic components that switch optical signals from one channel to another. The optical and/or electrical components 240 may be configured to provide an optical switching fabric, in some embodiments. As an example, the optical and/or electrical component(s) 240 may be configured to operate by mechanically shifting or moving an optical fiber to drive one or more alternative fibers. Alternatively, or additionally, the optical and/or electrical component(s) 240 may include components that facilitate switching between different port matchings by imparting electro-optic effects, magneto-optic effects, or the like. For instance, micromirrors, piezoelectric beam steering mechanisms, liquid crystals, filters, and the like may be provided in the optical and/or electrical components 240 to facilitate switching between different matching configurations of optical channels.

In some embodiments, the processing system 108 may correspond to an electrical switch, which means that the optical and/or electrical components 240 may include a number of electrical components or traditional electronic circuitry that is configured to manage packet flows and packet transmissions. Accordingly, the optical and/or electrical components 240 may alternatively or additionally include one or more Integrated Circuit (IC) chips, microprocessors, circuit boards, DPUs, simple analog circuit components (e.g., resistors, capacitors, inductors, etc.), digital circuit components (e.g., transistors, logic gates, etc.), memory devices, Field Programmable Gate Arrays (FPGAs), Application Specific Integrated Circuits (ASICs), combinations thereof, and the like.

Embodiments of the present disclosure contemplate operating a processing system 104 using a queue 244 stored in memory 128 for managing tasks to be handled or forwarded.

A device may comprise one or more queues 244. A queue may be a section of memory capable of storing data. Data stored in a queue may be identifiers of data elsewhere in memory of the device. A queue may represent a list of tasks which are to be handled by the device. For example, the device may be a switch and the tasks may be packets. Upon receiving a packet, the device may enqueue the packet in a queue until the device is ready to transmit the packet to a destination—or to otherwise handle the packet—at which point the packet may be dequeued from the queue.

In some embodiments, a queue may follow a first-in-first-out protocol, but it should be appreciated tasks may be enqueued and dequeued in any order without affecting the systems and methods described herein. As used herein, a task may refer to any type of data, such as a packet, or action item, which may be enqueued in a queue and dequeued from the queue. Moreover, while the systems and methods described herein relate to timing the handling of a task, it should be appreciated the same or similar methods may be used to measure the length time of any event.

Tasks may be stored in one or more queues upon receipt by a device. A task may be enqueued in a queue until the task is handled, transmitted, or otherwise dealt with by the device, at which point the task may be dequeued from the queue. In some embodiments, as described in greater detail below, the device may be configured to determine an amount of time each task is held in a queue by determining, according to multiple clocks, a time each task is enqueued and a time each task is dequeued. Based on one or more of the clocks, the device may be enabled to determine an amount of time each task spent in the queue.

Using the systems described above in relation to FIGS. 1 and 2, a method of determining latency of a task, a packet, or anything which can be timed, may be performed. A flowchart of such a method is illustrated in FIG. 4.

Figure 4:
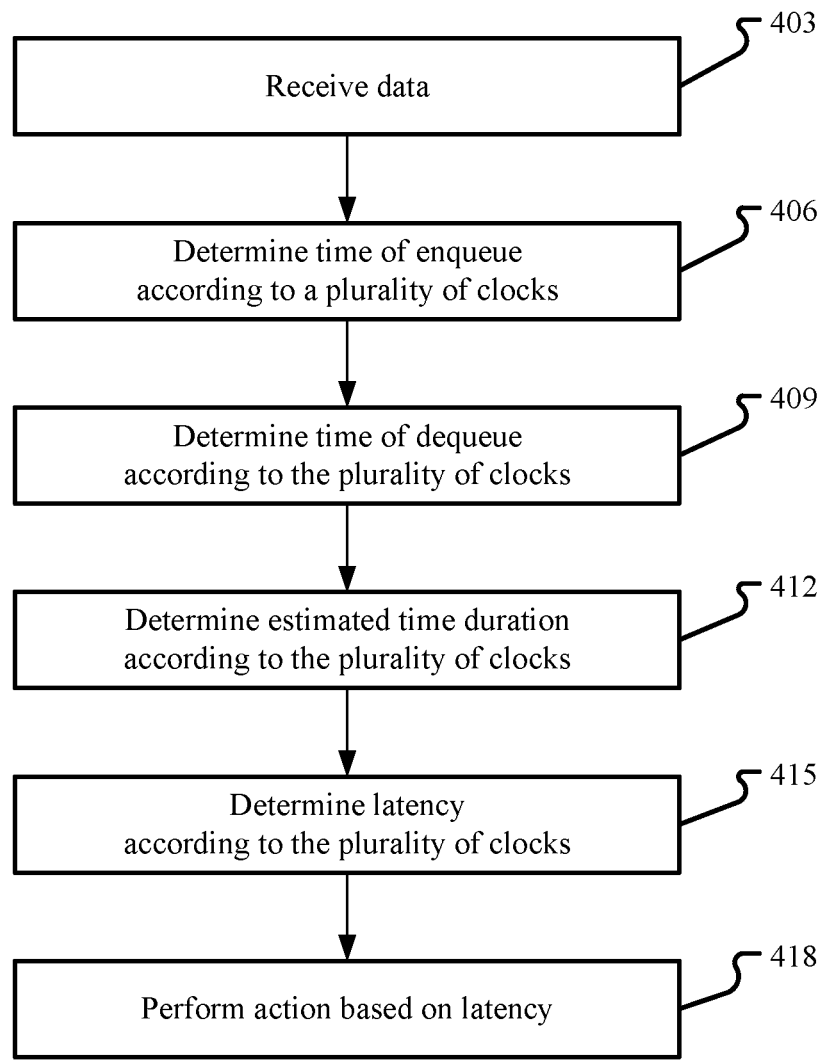
FIG. 4 is a flowchart of a method in accordance with one or more embodiments of the present disclosure.

The method illustrated in FIG. 4 may be performed by a device such as the communication system 200 illustrated in FIG. 2. While the description of the method of FIG. 4 relates to the use of the communication system 200, it should be appreciated any type of device may be used. Such a device may be, for example, a switch capable of receiving and transmitting packets of data. The method of FIG. 4 may be performed by any type of device or mechanism capable of monitoring any task which is to be handled, acted upon, queued, etc., and which is able to be timed. For example, the method may be performed by any type of mechanism and the tasks described may be any type of object or piece of data which can be associated with a start time and an end time.

At 403, the method may begin as data is received by the communication system 200. The data may be a task, such as a packet sent by a communication node 112*a-d* and received by a port 208*a-f*, or may be information associated with a task, such as a task identifier or metadata. The task may be associated with a destination. For example, header information in the task may identify an address or location to which the task should be sent. The task may be an action item configured to be performed by the communication system 200 or by another device.

At 406, a time of enqueue of the received task may be determined. The time of enqueue of the received task may be determined upon the task being added or enqueued to a queue. The time of enqueue of the received task may instead be a time of receipt, such as a time at which point the task is received by the communication system 200.

The time of enqueue of the received task may be a time or a count according to each of two or more clocks. For example, the communication system 200 may execute a plurality of clocks. Each clock may operate independently of other clocks. For example, each clock may count at a same or different rate to a same or different maximum clock count.

As used herein, a clock may refer to a counter or register which may count from zero to a particular number—or maximum clock count—before resetting to zero and continuing to count. A clock may be a section of memory holding a number representing a current time or count according to the clock.

Each clock may be driven by the same or a different clock signal. The clock signal may be processed prior to being used to increase the count of each clock. For example, one or more circuits or mechanisms may be utilized to adjust the rate of the clock signal and/or to pause the counting for a particular amount of time as described herein.

As illustrated in FIGS. 3A-3D, clocks may count at particular speeds. The square waves of FIGS. 3A-3D are illustrations of the speed at which each clock may count. As a square wave switches from zero to one, the current time or count of a clock associated with the square wave may increase. When the clock is at a maximum, the clock may be reset to zero at the next switch of the square wave from zero to one.

Figure 3A:
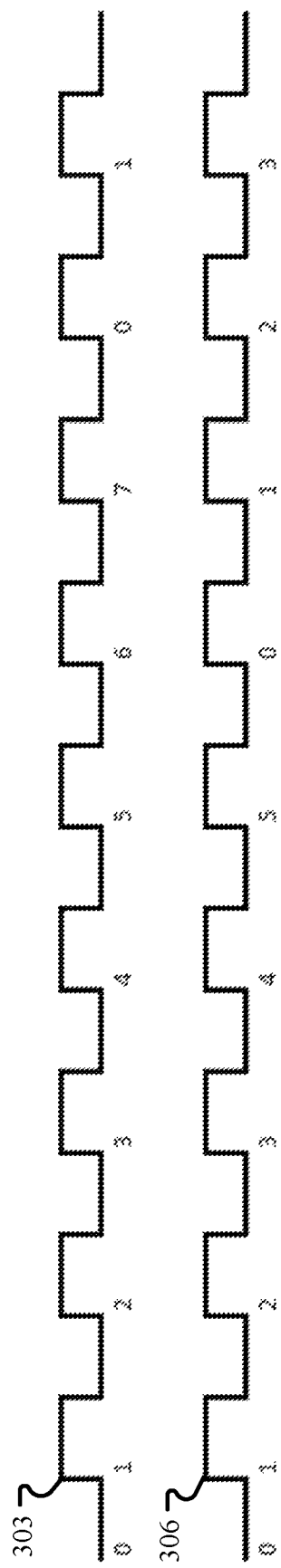
FIGS. 3A-3D are illustrations of timing waves in accordance with one or more embodiments of the present disclosure.

In FIG. 3A, a first clock, represented by the upper square wave 303, and a second clock, represented by the lower square wave 306, each count at a same rate. The first clock starts at zero and counts up to seven before resetting to zero. The second clock starts at zero and counts up to five before resetting to zero. As should be appreciated, each clock may count to a different maximum count. While the description herein generally relates to the use of two clocks, it should be appreciated any number of clocks may be used.

In some embodiments, the second clock may be modified by a random element. The random element may be used to modify the clock, for example, after the second clock reaches a maximum value, though it should be appreciated the random element may modify the clock at any time. While the description herein generally relates to the random modification of a second clock, it should be appreciated the first clock, a third clock, or any clock may similarly be modified instead of or in addition to the second clock.

The max counts of the first and second clocks may be any values. In the examples below, and in FIGS. 3A-3D, the clocks count from zero to five and from zero to seven. The numbers are used only as examples and should not be considered as limiting in any way.

A first example of a random element is a modification of a time duration of a clock period of the second clock. For example, after reaching a maximum value, the rate at which the second clock may be increased or decreased independently of other clocks.

Altering the rate of counting may occur after the second clock completes a full cycle of counting from zero to its maximum count value, though it should be appreciated the rate may be altered at any time.

A second example of a random element is a pausing of the second clock for a particular amount of time. The particular amount of time may be a random amount of time. The second clock may be paused after, for example, reaching the maximum value and before resetting the second clock to zero, or at any other time in one or more embodiments.

The amount of time of the pause may be a particular amount measured in clock ticks from a clock signal or in time (e.g., seconds). The amount of time may be random. The random amount of time may in some embodiments be based on one or more linear feedback shift registers. The pause may occur upon the second clock reaching its maximum value, upon being reset to zero, or at another time.

In some embodiments, the random element may be adjusting a maximum count of the second clock or adjusting another variable associated with the second clock.

The random elements may be applied separately or in combination. For example, in one or more embodiments only the first example of a random element may be applied, in one or more other embodiments, only the second example of a random element may be applied, in one or more other embodiments, both the first and second examples of random elements may be applied. Applying both the first and second examples of random elements may comprise modifying the rate at which the clock counts as well as pausing the clock at the same time. Alternatively, applying both the first and second examples of random elements may comprise alternately modifying the rate at which the clock counts and pausing the clock for different clock cycles. For example, after reaching a maximum count value for a first time, the clock may be paused for a random amount of time, and after reaching the maximum count value for a second time, the rate at which the clock counts may be adjusted randomly. The random modification for each clock cycle may be selected randomly or may follow any particular pattern.

While the first clock is described herein as counting to a constant maximum value with a constant clock rate, it should be appreciated the first clock may be adjusted similarly to the second clock in some embodiments. Furthermore, in some embodiments, the second clock may be only one of a plurality of randomly-adjusted-clocks. For example, an N number of clocks may be used. Each clock may be adjusted in the same or a different manner. For example, an Nth clock may pause at zero for a random amount of time, a clock rate of an N-1 clock may be adjusted randomly, a clock rate of an N-2 clock may be adjusted randomly and the N-2 clock may be paused randomly, etc.

Figure 3B:
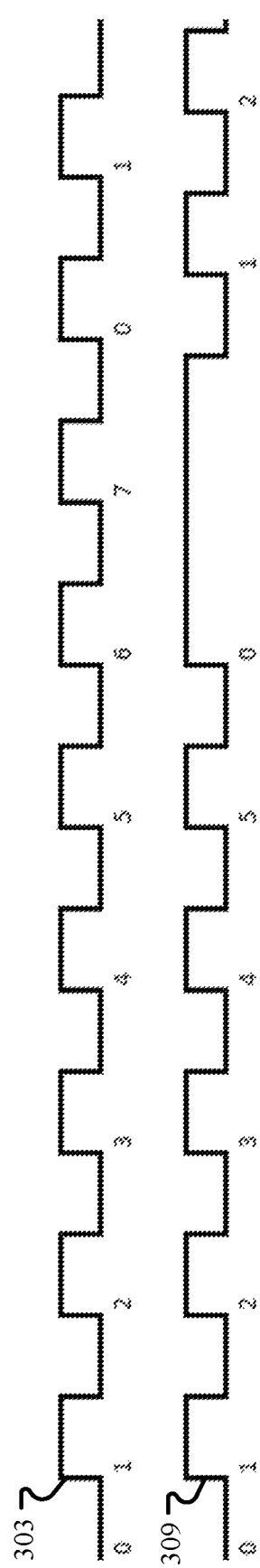

As illustrated in FIG. 3B, a first clock, represented by the upper square wave 303, and a second clock, represented by the lower square wave 309, may each count at a same rate. The first clock starts at zero and counts up to seven before resetting to zero. The second clock starts at zero and counts up to five before resetting to zero. The second clock, however, may pause for an amount of time during its counting.

Figure 3C:
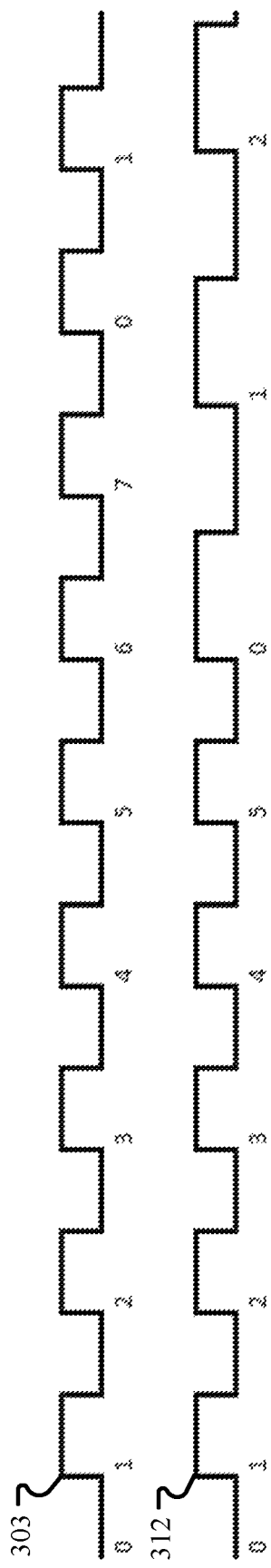

As illustrated in FIG. 3C, a first clock, represented by the upper square wave 303, and a second clock, represented by the lower square wave 312, may each count at the same or different rates. The first clock starts at zero and counts up to seven before resetting to zero. The second clock starts at zero and counts up to five before resetting to zero. The rate at which the second clock counts may be altered or adjusted.

Figure 3D:
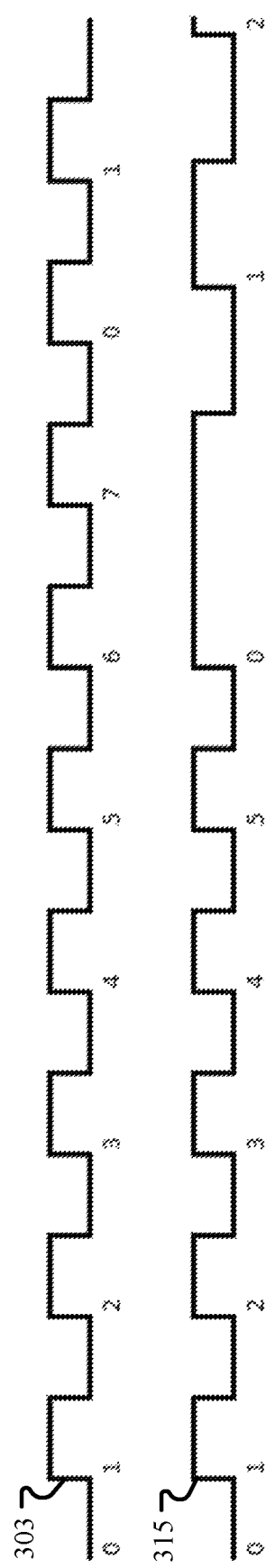

As illustrated in FIG. 3D, a first clock, represented by the upper square wave 303, and a second clock, represented by the lower square wave 315, may each count at a same rate. The first clock starts at zero and counts up to seven before resetting to zero. The second clock starts at zero and counts up to five before resetting to zero. The second clock may both be paused for an amount of time during its counting and the rate at which the second clock counts may be adjusted.

At 409, a time of dequeue of the task may be determined. The time of dequeue of the received task may be determined upon the task being removed or dequeued from the queue. The time of dequeue of the task may instead be a time of transmission, such as a time at which point the task is transmitted by the communication system 200 to a destination node. The time of dequeue of the task may be a time or a count according to each of the two or more clocks.

At 412, an estimated time duration of the task may be determined based on the time of enqueue and the time of dequeue according to each of the two or more clocks.

Determining the estimated time duration of a task may comprise, for each clock, determining a length of time, according to the respective clock, between the enqueuing of the task and the dequeuing of the task.

The estimated time duration of the task may be a number of clock ticks multiplied by the rate at which the clock ticks. It should be appreciated that because the rate at which one or more of the clocks tick may change, each clock tick may be individually multiplied by the clock rate for each tick.

Because the clocks count on a cycle, if the dequeue time or count is greater than the enqueue time or count, then the estimated time duration of the task may be equal to the dequeue time or count minus the enqueue time or count multiplied by the rate at which each of the clocks tick. For example, if the dequeue count is five and the enqueue count is two, then the estimated elapsed time may be three times the clock rate.

If the dequeue time or count is less than the enqueue time or count, then the estimated elapsed time may be equal to the dequeue time or count minus the enqueue time or count plus the maximum clock count times the rate at which the clock ticks. For example, if the dequeue count is two, the enqueue count is six, and the maximum count for the clock is eight, then the estimated elapsed time may be four, i.e., two minus six plus eight, times the clock rate.

At 415, based on the determined estimated time duration of the task according to each of the clocks, a latency of the task may be estimated. The estimated time duration of the task according to each clock may be compared to a threshold amount of time or a maximum time duration. If any one of the estimated time durations is greater than a maximum time duration, for example according to an SLA or user configuration settings, the task may be determined to be latent. The maximum time duration may be according to an SLA or a user setting. For example, determining the task is latent may be equivalent to determining the task breaches an SLA.

In some embodiments, three or more clocks may be used and determining the latency of the task exceeds the latency threshold may be based on an estimated time duration according to a third clock. It should be appreciated any number of clocks may be used. For example, determining the latency of the task exceeds the latency threshold may be based on an Nth estimated time duration according to an Nth clock and any one or more of the N clocks may be modified according to a random element.

At 418, an action may be performed based on the determined latency. As should be appreciated, a determination that a task is latent is valuable and useful information in and of itself. The determination may be used in any number of ways. In some embodiments, the computer system may record the task as latent. For example, a data entry may be made in a database or other form of data storage in the computer system or at a network location. In some embodiments, the computer system may transmit a message to a location associated with the task, indicating the task is latent. For example, the computer system may be enabled to provide feedback to a source of the task or to a destination of the task. In some embodiments, the computer system may mark the task as latent before forwarding the task. For example, in response to determining the latency of the task exceeds the latency threshold, the computer system may flag the task as associated with excessive latency by appending the task with one or more bits.

In some embodiments, the computer system may be enabled to determine a latency error has occurred in response to determining a number of tasks exceed the latency threshold. For example, a threshold of a predetermined number may be set. If a number of tasks in excess of the predetermined number are identified as latent, the computer system may determine an error situation has occurred.

Similarly, in some embodiments, the computer system may be enabled to compare latencies of tasks of a common type. If a particular number of tasks of a common type exceed the latency threshold, the computer system may perform an action such as notifying a source or destination of the tasks, recording metadata associated with the error situation in memory, identifying other tasks of the common type as being malicious, or another action may be performed.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured according to the following:

(1) A method of determining latency, the method comprising: determining a first length of time, according to a first clock, between an enqueuing of a task and a dequeuing of the task; determining a second length of time, according to a second clock, between the enqueuing of the task and the dequeuing of the task, wherein the second clock is modified by a random element after the second clock reaches a maximum value; and based on the first length of time and the second length of time, determining a latency of the task exceeds a latency threshold.

(2) The method of (1), wherein determining the latency of the task exceeds the latency threshold comprises determining the task breaches a service level agreement.

(3) The method of (1) and/or (2), wherein the random element comprises modifying a time duration of a clock period of the second clock.

(4) The method of any of (1)-(3), wherein the random element comprises pausing the second clock a random amount of time after the second clock reaches the maximum value and before resetting the second clock to zero.

(5) The method of any of (1)-(4), wherein the random element comprises, after pausing the second clock the random amount of time after the second clock reaches the maximum value, modifying a time duration of a clock period of the second clock.

(6) The method of any of (1)-(5), wherein the random amount of time is based on one or more linear feedback shift registers.

(7) The method of any of (1)-(6), wherein determining the latency of the task exceeds the latency threshold is further based on a third length of time according to a third clock, wherein the third clock is modified by a second random element after the third clock reaches a second maximum value.

(8) The method of any of (1)-(7), further comprising, in response to determining the latency of the task exceeds the latency threshold, flagging the task as associated with excessive latency by appending the task with one or more bits.

(9) The method of any of (1)-(8), further comprising determining a latency error has occurred in response to determining a predetermined number of tasks exceed the latency threshold.

(10) The method of any of (1)-(9), further comprising determining a plurality of tasks of a common type exceed the latency threshold.

(11) A device, comprising: one or more circuits configured to perform a method, the method comprising: determining a first length of time, according to a first clock, between an enqueuing of a task and a dequeuing of the task; determining a second length of time, according to a second clock, between the enqueuing of the task and the dequeuing of the task, wherein the second clock is modified by a random element after the second clock reaches a maximum value; and based on the first length of time and the second length of time, determining a latency of the task exceeds a latency threshold.

(12) The device of (11), wherein determining the latency of the task exceeds the latency threshold comprises determining the task breaches a service level agreement.

(13) The device of (11) and/or (12), wherein the random element comprises modifying a time duration of a clock period of the second clock.

(14) The device of any of (11)-(13), wherein the random element comprises pausing the second clock a random amount of time after the second clock reaches the maximum value and before resetting the second clock to zero.

(15) The device of any of (11)-(14), wherein the random amount of time is based on one or more linear feedback shift registers.

(16) The device of any of (11)-(15), wherein determining the latency of the task exceeds the latency threshold is further based on a third length of time according to a third clock, wherein the third clock is modified by a second random element after the third clock reaches a second maximum value.

(17) The device of any of (11)-(16), wherein the method further comprises, in response to determining the latency of the task exceeds the latency threshold, flagging the task as associated with excessive latency by appending the task with one or more bits.

(18) The device of any of (11)-(17), wherein the method further comprises determining a latency error has occurred in response to determining a predetermined number of tasks exceed the latency threshold.

(19) The device of any of (11)-(18), wherein the method further comprises determining a plurality of tasks of a common type exceed the latency threshold.

(20) A switch comprising: one or more circuits configured to perform a method, the method comprising: determining a first length of time, according to a first clock, between an enqueuing of a packet and a dequeuing of the packet; determining a second length of time, according to a second clock, between the enqueuing of the packet and the dequeuing of the packet, wherein the second clock is modified by a random element after the second clock reaches a maximum value; and based on the first length of time and the second length of time, determining a latency of the packet exceeds a latency threshold.

What is claimed is:

1. A method of determining latency which exceeds a latency threshold, the method comprising:
   determining a first length of time, according to a first clock, between an enqueuing of a task and a dequeuing of the task;
   determining a second length of time, according to a second clock, between the enqueuing of the task and the dequeuing of the task, wherein the second clock is modified by a random element after the second clock reaches a maximum value; and
   based on the first length of time and the second length of time, determining a latency of the task exceeds the latency threshold.

2. The method of claim 1, wherein determining the latency of the task exceeds the latency threshold comprises determining the task breaches a service level agreement.

3. The method of claim 1, wherein the random element comprises modifying a time duration of a clock period of the second clock.

4. The method of claim 1, wherein the random element comprises pausing the second clock a random amount of time after the second clock reaches the maximum value and before resetting the second clock to zero.

5. The method of claim 4, wherein the random element comprises, after pausing the second clock the random amount of time after the second clock reaches the maximum value, modifying a time duration of a clock period of the second clock.

6. The method of claim 4, wherein the random amount of time is based on one or more linear feedback shift registers.

7. The method of claim 1, wherein determining the latency of the task exceeds the latency threshold is further based on a third length of time according to a third clock, wherein the third clock is modified by a second random element after the third clock reaches a second maximum value.

8. The method of claim 1, further comprising, in response to determining the latency of the task exceeds the latency threshold, flagging the task as associated with excessive latency by appending the task with one or more bits.

9. The method of claim 1, further comprising determining a latency error has occurred in response to determining a predetermined number of tasks exceed the latency threshold.

10. The method of claim 1, further comprising determining a plurality of tasks of a common type exceed the latency threshold.

11. A device, comprising:
    one or more circuits configured to perform a method, the method comprising:
       determining a first length of time, according to a first clock, between an enqueuing of a task and a dequeuing of the task;
       determining a second length of time, according to a second clock, between the enqueuing of the task and the dequeuing of the task, wherein the second clock is modified by a random element after the second clock reaches a maximum value; and
       based on the first length of time and the second length of time, determining a latency of the task exceeds a latency threshold.

12. The device of claim 11, wherein determining the latency of the task exceeds the latency threshold comprises determining the task breaches a service level agreement.

13. The device of claim 11, wherein the random element comprises modifying a time duration of a clock period of the second clock.

14. The device of claim 13, wherein the random element comprises pausing the second clock a random amount of time after the second clock reaches the maximum value and before resetting the second clock to zero.

15. The device of claim 14, wherein the random amount of time is based on one or more linear feedback shift registers.

16. The device of claim 15, wherein determining the latency of the task exceeds the latency threshold is further based on a third length of time according to a third clock, wherein the third clock is modified by a second random element after the third clock reaches a second maximum value.

17. The device of claim 11, wherein the method further comprises, in response to determining the latency of the task exceeds the latency threshold, flagging the task as associated with excessive latency by appending the task with one or more bits.

18. The device of claim 11, wherein the method further comprises determining a latency error has occurred in response to determining a predetermined number of tasks exceed the latency threshold.

19. The device of claim 11, wherein the method further comprises determining a plurality of tasks of a common type exceed the latency threshold.

20. A switch comprising:
    one or more circuits configured to perform a method, the method comprising:
       determining a first length of time, according to a first clock, between an enqueuing of a packet and a dequeuing of the packet;
       determining a second length of time, according to a second clock, between the enqueuing of the packet and the dequeuing of the packet, wherein the second clock is modified by a random element after the second clock reaches a maximum value; and based on the first length of time and the second length of time, determining a latency of the packet exceeds a latency threshold.

\* \* \* \* \*